United States Patent [19]
Chen

[11] Patent Number: 5,825,553
[45] Date of Patent: Oct. 20, 1998

[54] EYEPIECE DESIGN

[75] Inventor: Chungte W. Chen, Irvine, Calif.

[73] Assignee: Hughes Aircraft Company now known as Ragtheon Company, Los Angeles, Calif.

[21] Appl. No.: 159,006

[22] Filed: Nov. 29, 1993

[51] Int. Cl.$^6$ ............................. G02B 17/00; G02B 25/00
[52] U.S. Cl. ........................... 359/643; 359/727; 359/728
[58] Field of Search ...................................... 359/727, 728, 359/643, 644–647

[56] References Cited

U.S. PATENT DOCUMENTS

| | | | |
|---|---|---|---|
| 2,423,676 | 7/1947 | Altman | 359/645 |
| 4,934,801 | 6/1990 | Mercado | 359/727 |
| 5,004,331 | 4/1991 | Haseltine et al. | 359/728 |
| 5,034,763 | 7/1991 | Ihabata | 359/646 |
| 5,073,016 | 12/1991 | Burke | 359/727 |
| 5,317,451 | 5/1994 | Hasushita | 359/643 |

FOREIGN PATENT DOCUMENTS

| | | |
|---|---|---|
| 1342064 | 9/1963 | France . |
| 5-303055 | 11/1993 | Japan . |
| 2 182 160 | 5/1987 | United Kingdom . |

*Primary Examiner*—Scott J. Sugarman
*Attorney, Agent, or Firm*—Leonard A. Alkov; William C. Schubert; Glenn H. Lenzen, Jr.

[57] ABSTRACT

An improved eyepiece for an optical system. In general, the inventive eyepiece (10) includes a refractive element (16) and an optical arrangement for relaying the entrance pupil of the system to the refractive element. In a specific implementation, the optical arrangement includes a concave primary mirror (12) and a secondary mirror (14). The mirrors are mounted to communicate an image from the refractive element (16) to the entrance pupil (40). In the specific implementation, the refractive element (16) is one or more refractive lenses. The use of a reflective optical arrangement allows for the long eye relief. The placement of the entrance pupil close to the pupil of the lens allows for the use of a compact optical arrangement with high ratio of eye relief to effective focal length with a compact optical arrangement. The system affords minimal lateral chromatic aberration and good image quality.

21 Claims, 1 Drawing Sheet

EYEPIECE DESIGN

BACKGROUND OF THE INVENTION

1. Field of the Invention

The present invention relates to optics. More specifically, the present invention relates to eyepieces for optical instruments.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Many optical systems including microscopes, telescopes, binoculars and the like, include an eyepiece into which the user peers to observe an image provided by the system. The conventional eyepiece, such as that disclosed in U.S. Pat. No. 2,423,676, entitled EYEPIECE, issued Jul. 8, 1947 to Fred E. Altman is typically constructed with an arrangement of refractive optical elements or lenses.

Eye relief is an important consideration in the design of an optical system. Eye relief is the distance between the iris of the eye of the observer and the first surface of the first lens of the system.

For reasons of safety and convenience, a long eye relief is desirable. In weapons systems, for example, an optical instrument may be utilized as a sighting mechanism. For certain weapons such as rocket and missile launchers, long eye relief is desired to prevent injury to the user due to any recoil of the weapon when the weapon is fired. In microscopes, long eye relief allows the user to view the sample under examination from a convenient distance causing less effort, eye strain and stress. However, there are several countervailing considerations which prevent the designer from optimizing the system on the basis of eye relief alone.

The first is the general requirement that the field-of-view of the eyepiece equal the field-of-view of the user. With the typical focusing lenses of the conventional refractive eyepiece, when the observer's eye is at the pupil position, the observer will see the entire image located at the eyepiece image plane. As the observer moves his eye longitudinally away from the eyepiece, the outer portion of the field-of-view will first be vignetted and then finally disappear. Therefore, the sizes of the lenses have to increase almost linearly with respect to the longitudinal eye displacement or eye relief in order to maintain the same field-of-view. Unfortunately, the edge thickness of a focusing lens approaches zero very quickly. Therefore, a thickening each lens is necessary to accommodate longer eye relief. However, because of the quadratic relationship between the size of the lens and thickness thereof due to curvature, thickness increases rapidly with size. Accordingly, larger lenses are generally much thicker, heavier and more costly and the image quality therethrough is much generally lower than the lenses required in instruments with smaller eye relief. In general, when the ratio of eye relief to effective focal length (EREFL) is less than one, good image quality is easily obtainable. However, when the EREFL exceeds unity, good image quality is difficult to achieve and the eyepiece becomes impracticably bulky.

In addition, conventional refractive eyepieces suffer from poor image quality due to severe chromatic aberration, large field curvature and chromatic aberration.

Thus, there is an ongoing need in the art for a low cost, light weight system design which offers long eye relief and good image quality.

SUMMARY OF THE INVENTION

The need in the art is addressed by the present invention which provides an improved eyepiece for an optical system. In general, the inventive eyepiece includes a refractive element and an optical arrangement for relaying the entrance pupil of the system to the refractive element. In a specific implementation, the optical arrangement includes a concave primary mirror and a secondary mirror. The mirrors are mounted to communicate an image from the refractive element to the entrance pupil. In the specific implementation, the refractive element is one or more refractive lenses.

The use of a reflective optical arrangement allows for the long eye relief. The placement of the entrance pupil close to the lens allows for the use of a compact optical arrangement with high ratio of eye relief to effective focal length with a compact optical arrangement. The system affords minimal chromatic distortion and good image quality.

DESCRIPTION OF THE INVENTION

Illustrative embodiments and exemplary applications will now be described with reference to the accompanying drawings to disclose the advantageous teachings of the present invention.

Figure 1:
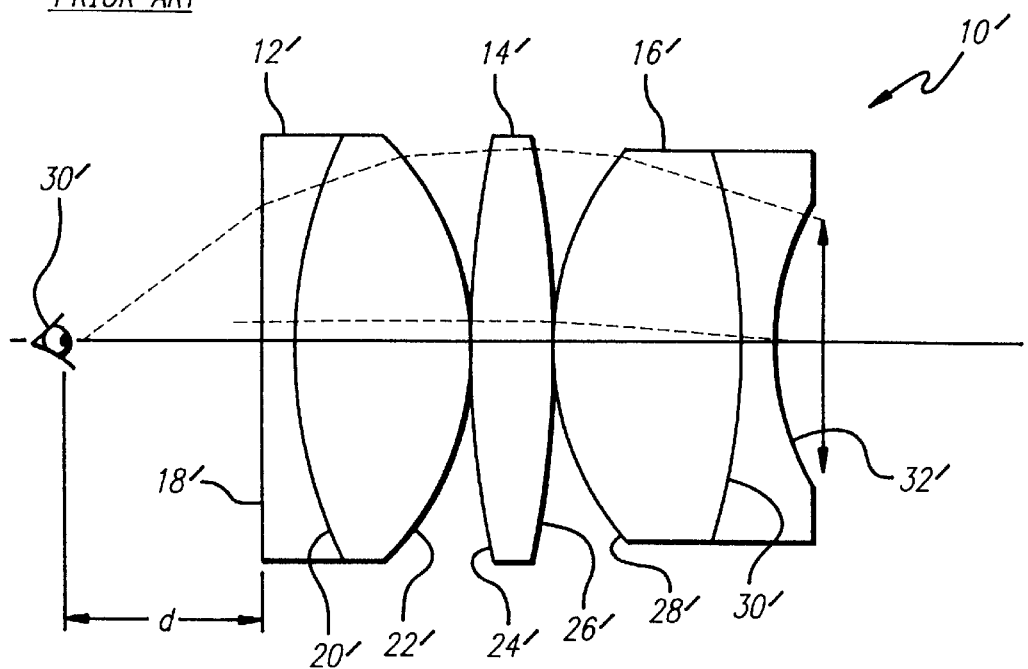
FIG. 1 is a diagram of an eyepiece constructed in accordance with conventional teachings.

FIG. 1 is a diagram of a conventional eyepiece. The eyepiece 10' includes a first cemented doublet 12', a singlet 14' and a second cemented doublet 16'. The first cemented doublet comprises a plano-concave negative power lens and a double-convex positive power lens, with the first, second and third surfaces 18', 20' and 22', respectively. The singlet 14' has positive optical power with the first and second surfaces 24' and 26', respectively. The second cemented doublet comprises a double-convex positive power lens and a double-concave negative power lens with the first, second and third surfaces 28', 30' and 32', respectively. To balance the chromatic aberrations, the positive power lenses and the negative power lenses would generally be constructed with crown glasses (having low dispersion characteristics) and flint glasses (having high dispersion characteristics), respectively. The result is a bulky optical arrangement with short eye relief 'd' vis-a-vis the eye 30' of an observer.

As mentioned above, the ratio of eye relief to effective focal length of the eyepiece 10' of FIG. 1 can be expected to be less than one. Increases in eye relief in accordance with conventional teachings are afforded with compromise of system performance, size, weight and cost.

The present invention addresses the need in the art for an eyepiece design which offers long eye relief at low cost, size and weight with good image quality.

Figure 2:
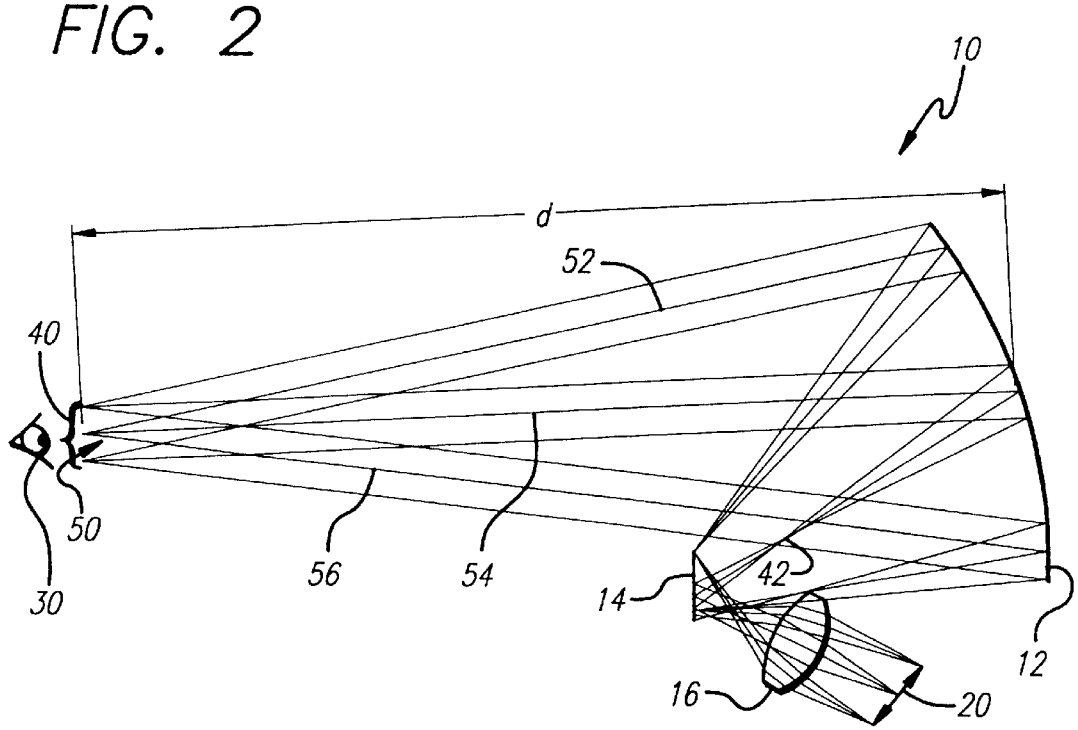
FIG. 2 is a diagram of an eyepiece constructed in accordance with the teachings of the present invention.

An eyepiece constructed in accordance with the present teachings is illustrated in FIG. 2. The eyepiece 10 includes a primary mirror 12, a secondary mirror 14 and a refractive lens 16. The primary mirror 12 is concave. The secondary mirror 14 may be concave, flat or convex. The reflective surfaces of both mirrors 12 and 14 may be either spherical, aspheric or generalized in shape. The lens 16 may be replaced with a group of refractive elements with at least two different optical materials for chromatic aberration correction. The refractive elements may be spherical or aspheric in shape.

Light from the image plane 20 is relayed by the lens 16, reflected by the secondary mirror 14 to the primary mirror 12 and collimated by the primary mirror on the entrance pupil 40. Although the intermediate image surface 42 is disposed between the primary mirror and the secondary mirror, it may be disposed between the secondary mirror and the lens 16 for some applications.

As discussed below, in the preferred embodiment, the design of system is such that the entrance pupil 40 is relayed to a point between the secondary mirror 14 and the lens 16. This allows for the size of the lens 16 and the secondary mirror 14 to be minimized while affording good image quality by minimizing lateral chromatic aberrations.

The design methodology of the present invention is as follows. First, the desired eye relief is selected. This distance 'd' is measured as the length of the center ray 54 from the entrance pupil 40 to the primary mirror 12. Next, the field-of-view is selected. The field-of-view is the angle between the top and bottom rays 52 and 56 of the center bundle 50 of rays as shown in FIG. 2. The pupil size 's' is set as the diameter of the entrance pupil 40. The beamwidth, the field of view, helps to set the size of the primary mirror 12. The focal length of the primary mirror 12 is used to determine the spacing thereof and the size and spacing of the secondary mirror 14 in a conventional manner. The radius of curvature, size and shape of the active surfaces of the optical elements would be determined in a conventional manner using a program such as CODEV licensed by Optical Research Associated, Inc. For the lens 16 or the refractive group, other parameters such as the type and thickness of glass, the merit function would be factored in as well. The program would be commanded to vary the radii of curvature (surface function) of the primary and secondary mirrors and the spacing therebetween the primary mirror and the secondary mirror as well as the spacing between the primary mirror and the refractive element(s) to relay the entrance pupil 40 to the entrance pupil of the lens 16. As mentioned above, this allows for the secondary mirror and the lens to be compact while minimizing chromatic aberrations therein. In some applications, the surface function of the primary and secondary mirrors and some of the lenses can be generalized aspheric surface shapes to obtain better image quality and distortion characteristics.

Thus, the present invention has been described herein with reference to a particular embodiment for a particular application. Those having ordinary skill in the art and access to the present teachings will recognize additional modifications applications and embodiments within the scope thereof. For example, the secondary mirror can be either tilted, decentered or tilted and decentered with respect to the axis of the primary mirror to balance the asymmetric aberration generated by the primary mirror. The refractive lens element(s) can be either tilted, decentered or tilted and decentered with respect to the axis of the primary mirror to further reduce any residual asymmetric aberration. In addition, chromatic aberration may be reduced further with use of a diffractive element, such as a grating, a frenzel lens, or a zone plate, on the surface of the lens or as a stand alone element. See U.S. Pat. Nos. 5,044, 706, entitled OPTICAL ELEMENT EMPLOYING ASPHERICAL AND BINARY GRATING OPTICAL SURFACES, issued Sep. 3, 1991 to C. W. Chen; 5,148,314, entitled OPTICAL SYSTEMS EMPLOYING REFRACTIVE AND DIFFRACTIVE OPTICAL ELEMENTS TO CORRECT FOR CHROMATIC ABERRATION, issued Sep. 15, 1992, to C. W. Chen; and 5,151,823, entitled BIOCULAR EYEPIECE OPTICAL SYSTEM EMPLOYING REFRACTIVE AND DIFFRACTIVE OPTICAL ELEMENTS, issued Sep. 29, 1992, to C. W. Chen, the teachings of which are incorporated herein by reference.

It is therefore intended by the appended claims to cover any and all such applications, modifications and embodiments within the scope of the present invention.

Accordingly,

What is claimed is:

1. An eyepiece for an optical system for relaying an image to an associated entrance pupil, said eyepiece comprising:
   a refractive element for forming an intermediate image at an intermediate image surface between the refractive element and the entrance pupil;
   a reflective relay subsystem optically coupled between the entrance pupil and the refractive element, said reflective relay subsystem including a first mirror for relaying the intermediate image to the entrance pupil, and a second mirror for optically coupling the refractive element to the first mirror.

2. The eyepiece of claim 1 wherein said reflective means includes a first mirror mounted to communicate said intermediate image surface from said refractive element to said entrance pupil.

3. The eyepiece of claim 2 wherein said reflective means further includes a second mirror for communicating said intermediate image surface from said refractive element to said first mirror.

4. The eyepiece of claim 1 wherein said first mirror is concave.

5. The eyepiece of claim 4 wherein the entrance pupil of the system is relayed to a position between the refractive element and the first mirror.

6. The eyepiece of claim 1 wherein said refractive element is a lens.

7. In an optical system having an eyepiece with a refractive element therein and an input aperture serving as an entrance pupil:
   an eye relief subsystem for relaying said entrance pupil to an intermediate image surface optically disposed between said refractive element and said entrance pupil, said eye relief means including:
   a first reflective element optically disposed between the intermediate image surface and the entrance pupil and
   a second reflective element optically disposed between the refractive element and the first reflective element.

8. An eyepiece, comprising:
   an image plane operable to receive light;
   a relay means operable to relay light from said image plane to an intermediate image surface;
   a first mirror operable to reflect said light from the relay means to the intermediate image surface;
   a second mirror operable to receive and collimate said light from the first mirror and further operable to reflect the received collimated light to an entrance pupil.

9. The eyepiece of claim 8 wherein said relay means is a lens.

10. The eyepiece of claim 8 wherein said relay means includes at least two refractive elements each of said refractive elements comprising at least two different optical materials.

11. The eyepiece claim 8 wherein said first mirror is concave.

12. The eyepiece of claim 8 wherein said first mirror is flat.

13. The eyepiece of claim 8 wherein said first lens is convex.

14. The eyepiece of claim 10 wherein said refractive elements are spherical in shape.

15. The eyepiece of claim 10 wherein said refractive elements are aspherical in shape.

16. The eyepiece of claim 8 wherein said first mirror is spherical in shape.

17. The eyepiece of claim 8 wherein said first mirror is aspherical in shape.

18. The eyepiece of claim 8 wherein said first mirror is generalized in shape.

19. The eyepiece of claim 8 wherein said second mirror is spherical in shape.

20. The eyepiece of claim 8 wherein said second mirror is aspherical in shape.

21. The eyepiece of claim 8 wherein said second mirror is generalized in shape.

* * * * *

UNITED STATES PATENT AND TRADEMARK OFFICE
CERTIFICATE OF CORRECTION

PATENT NO : 5,825,553
DATED : October 20, 1998
INVENTOR(S) : Chungte W. Chen

It is certified that error appears in the above-identified patent and that said Letters Patent is hereby corrected as shown below:

Title page, column 1, line [73], after "now known as", please delete "Ragtheon" and insert therefor --Raytheon--.

Signed and Sealed this

Ninth Day of March, 1999

Attest:

Q. TODD DICKINSON

*Attesting Officer*  *Acting Commissioner of Patents and Trademarks*